United States Patent [19]

Welborn

[11] 4,172,320
[45] Oct. 30, 1979

[54] VEGETABLE AND FLOWER SNIP APPARATUS

[76] Inventor: Woodrow W. Welborn, Rte. 9, Box 375, Laurel, Miss. 39440

[21] Appl. No.: 898,593

[22] Filed: Apr. 21, 1978

[51] Int. Cl.² ............................................. B26B 13/22
[52] U.S. Cl. ................................................... 30/134
[58] Field of Search ........................... 30/134, 135, 240

[56] References Cited

U.S. PATENT DOCUMENTS

| | | | |
|---|---|---|---|
| 278,017 | 5/1883 | Howells | 30/134 |
| 300,031 | 6/1884 | Taft | 30/134 |
| 1,123,929 | 1/1915 | Russell | 30/134 |
| 3,047,945 | 8/1962 | Logan | 30/134 |
| 3,802,074 | 4/1974 | Hoppe | 30/134 |

Primary Examiner—Jimmy C. Peters
Attorney, Agent, or Firm—George R. Douglas, Jr.; Sherman Levy

[57] ABSTRACT

An improved vegetable and flower snip apparatus for cutting the vegetable okra and thorny type flowers which includes a scissor-type snip having a mating set of nose elements at the terminal end thereof from the handle portion so that there are blade cutting elements and which provide for holding the stem in place while being snipped or sheared.

3 Claims, 3 Drawing Figures

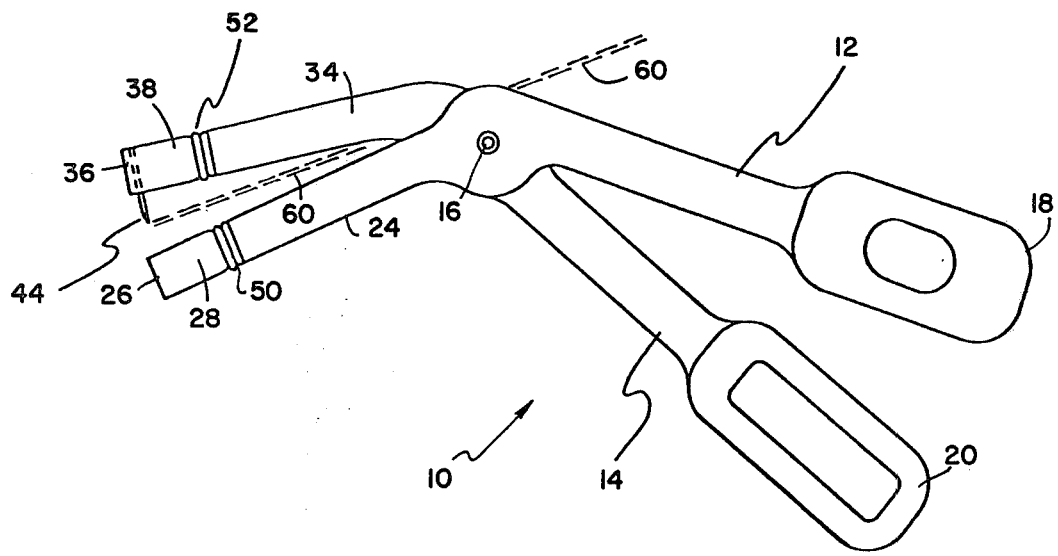
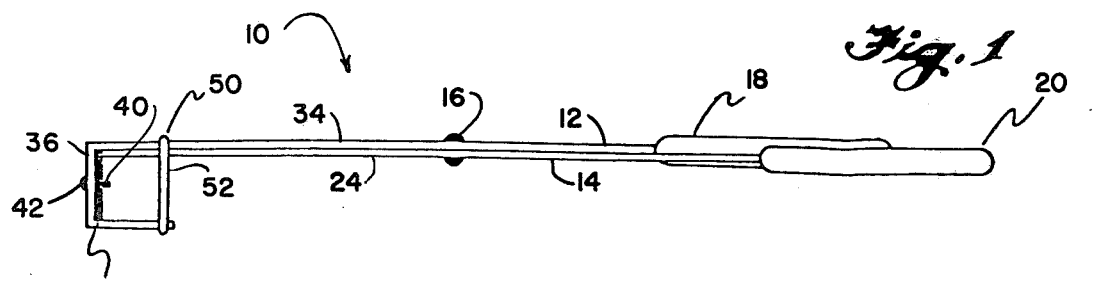
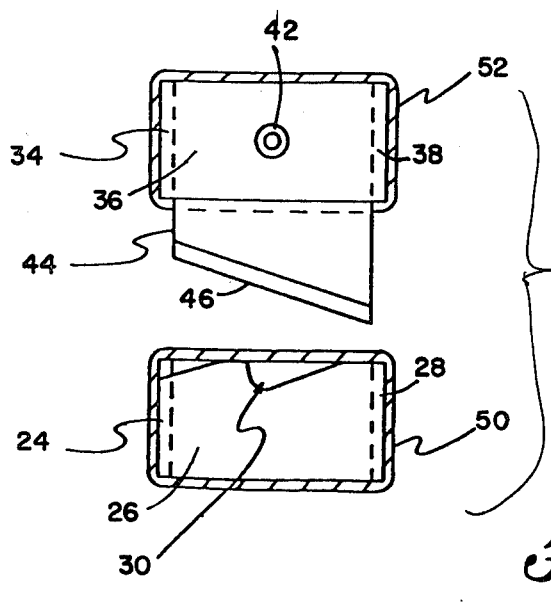

VEGETABLE AND FLOWER SNIP APPARATUS

CROSS REFERENCE TO PRIOR ART DISCLOSURES

The invention is an improvement of patents such as those found of cursory interest as follows: U.S. Pat. Nos. 1,653,412, Poplawsky; 2,090,341, Burnham; 3,193,926, Honiss.

BRIEF SUMMARY OF THE INVENTION

The present invention relates to the improved vegetable and flower snip apparatus in which there is a set of cutting edges perpendicularly disposed generally to the longitudinal length of the shears or scissors elements and in which one of the blades possesses a notch or recess for retaining the stem in place while being cut. More particularly the invention relates generally to the harvesting or gathering of the vegetable okra and thorny type flowers by providing an improved device on a set of shears or scissors elements in which the cutting blade is disposed perpendicularly generally to the longitudinal portion of the shear elements distal from the handle portion and in which there are unique features to the cutting blade as described above, together with a rubber ring for holding the stem in place after it has been severed.

BACKGROUND OF THE INVENTION

The prior art devices are repleat with devices that do not provide for ease and efficiency in the method and apparatus for cutting vegetables and thorny type flowers, but it has been found that the present invention provides the object, advantages and features of improved and simple accomplishment in the cutting of the vegetable okra and thorny type flowers. It is further an object and advantage of the invention to provide a scissors type apparatus with a blade mounted perpendicular to the handles or to the distal end from the handles and to provide a notch on the lower member to cradle the stem to be cut. Further an object of the invention is to provide on top and bottom members of a neck adjacent to the blade with a rubber ring to support the body of the stem being cut. These rubber rings also allow the item to be removed from the bush and held in place so that the stem can be emptied into a container or it can be held for other disposition without actually touching it with the hands.

A further object and advantage of the present invention is to provide apparatus for cutting a vegetable without actually touching the plant with one's hands. A further and additional object of the present invention is to provide apparatus for cutting thorny type flowers without contact with one's hands when not using gloves or other protective means.

An object of the invention is also seen in providing a rubber ring or rings mounted on a nose structure of the shears for holding the item while being cut from a bush and being held in place until disposed or dropped when opening the scissors element.

SUMMARY

The invention is a scissors type snip which is used to harvest okra and pick thorny type flowers, roses and the like, without necessitating and requiring contact of the stem or the cut plant with one's hands.

BRIEF DESCRIPTION OF THE SEVERAL VIEWS OF THE DRAWING

The above and other objects and advantages of the invention will become apparent upon full consideration of the following detailed description and accompanying drawings in which:

FIG. 1 is a side elevation view of a preferred embodiment of the invention according to the best mode thereof;

FIG. 2 is a side or edge view of FIG. 1; and

FIG. 3 is a cross-sectional view of the invention of FIG. 1 taken along lines 3—3 of FIG. 1.

DETAILED DESCRIPTION OF A PREFERRED EMBODIMENT OF THE INVENTION

Referring now to the drawings there is shown an improved vegetable and flower snip apparatus 10 comprising a pair of cooperative shear or scissor members 12, 14 intermediately connected by a pivot 16 and having at the proximate end a thumb receiving opening or handle 18 and a finger receiving opening or handle 20.

At the distal or other end 24 of the scissor or shear member 12 there is a nose or tubular structure formed by a U-shaped extension of the end 24 in which the bottom portion of the U is the nose element 26 and the free end thereof forms the other side of the U-shaped element 28. Part of the bottom member 26 forms a blade element as shown and having a notch 30 for receiving vegetable or flower stems as is described above in this specification.

The other end of the scissor member 14 similarly terminates in a U-shaped configuration comprising the end 34, the bottom portion 36 of the U-shaped member, and the free end thereof shown as member 38. Centrally of the bottom portion 36 there is an opening 40 for receiving a rivet or screw element 42 to which is secured in tight relation a cutting blade 44 having an edge 46 disposed on a bias. The blade 44 engages with the bottom 26 having the notch 30 in a side-to-side and shearing relationship for cutting stems and other vegetable structures as described.

Recessed from the bottom of the U-shaped configurations 24–28 and 34–38 there may be provided an endless rubber ring 50, 52 so that as a stem is cut, it is held in place by contact with the mating portions of the rubber ring, which are interior of the shearing structure and above the blade elements 26, 46. These rubber rings are disposed to support the body of the stem during and after being cut by the vegetable and flower snip 10.

It is important that during the cutting operation that the operator's hand, including the thumb and the finger engaging the handles 18, 20 do not come in contact with the thorny stem or the vegetable stem, which in this case is usually okra, because of the gummy consistency of cut okra. For this reason the shear members 12, 14 as they extend into ends 24, 34 extend through and turn through an angle of about 120° as illustrated in FIG. 1. This provides that the stem may not engage with the hand or the thumb and finger area that engages the handle of the flower snip apparatus 10. Illustratively, the flower stem may be shown as a stem 60 illustrated in dotted line in FIG. 1.

While the rubber ring holds the stem after being cut, it is sufficient that it can and usually holds the stem for it to be removed from the bush and for being emptied into the container without actually touching the stem by one's hands.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. An improved okra harvesting thong and snip apparatus comprising a pair of pivotally oriented cooperative members having at one end respective thumb and finger receiving opening means, the other end of one of the pair of cooperative members having a cutter blade element disposed on a nose extension member extending transverse to the length of cooperative member, the other end of the other of the pair of cooperative members having an edge disposed on a mating nose extension member extending transverse to the length of the cooperative member on which it is mounted, said cutter blade element having its cutting element disposed on the bias and a notch in the edge disposed on the mating nose for holding a stem of the vegetable or flower to be snipped, and cooperative members being bent essentially through an arc of about 120°, both the cooperative members adjacent the nose and mating nose each having a rubber ring disposed thereabout to support the body of the stem being cut and until dumped by opening the snip apparatus.

2. The invention of claim 1 wherein said rings also allow the stems to be removed from a bush for being emptied into a container without actually touching one's hands.

3. The invention of claim 1 wherein the cutter blade element is retained by a rivet in place on said nose for removal and replacement.

* * * * *